(12) United States Patent
Ding et al.

(10) Patent No.: US 7,028,301 B2
(45) Date of Patent: Apr. 11, 2006

(54) SYSTEM AND METHOD FOR AUTOMATIC WORKLOAD CHARACTERIZATION

(75) Inventors: Yiping Ding, Dover, MA (US); Kenneth Newman, Cambridge, MA (US)

(73) Assignee: BMC Software, Inc., Houston, TX (US)

( * ) Notice: Subject to any disclaimer, the term of this patent is extended or adjusted under 35 U.S.C. 154(b) by 830 days.

(21) Appl. No.: 10/014,337

(22) Filed: Dec. 10, 2001

(65) Prior Publication Data

US 2002/0116441 A1  Aug. 22, 2002

Related U.S. Application Data

(60) Provisional application No. 60/254,340, filed on Dec. 8, 2000.

(51) Int. Cl.
*G06F 9/46* (2006.01)

(52) U.S. Cl. ............... 718/104; 718/105; 705/7
(58) Field of Classification Search ............... 714/20, 714/25, 45; 702/182, 186; 718/103, 105, 718/104; 705/8
See application file for complete search history.

(56) References Cited

U.S. PATENT DOCUMENTS

| | | | | |
|---|---|---|---|---|
| 5,655,081 A | * | 8/1997 | Bonnell et al. | 709/202 |
| 5,696,701 A | * | 12/1997 | Burgess et al. | 714/25 |
| 5,761,091 A | * | 6/1998 | Agrawal et al. | 702/186 |

* cited by examiner

*Primary Examiner*—Lewis A. Bullock, Jr.
(74) *Attorney, Agent, or Firm*—Wong, Cabello, Lutsch, Rutherford & Brucculeri LLP

(57) ABSTRACT

A system and method for automatic workload characterization are provided. Transactions performed in a computer system may be logged. The log of transactions comprises a timestamp for each transaction. Resource usage in the computer system may be logged. The log of resource usage comprises one or more periods of time during which each of a plurality of resources is used, and the log of resource usage comprises a plurality of system performance metrics which reflect resource consumption by one or more processes that performed the transactions. The timestamps in the log of transactions may be compared to the periods of time in the log of resource usage. It may be determined which transactions used which resources as a result of the comparing the timestamps in the log of transactions to the periods of time in the log of resource usage. One or more workloads may be determined using the determining which transactions used which resources. Heuristics may be used to group processes into workloads.

48 Claims, 11 Drawing Sheets

| | | | | | | |
|---|---|---|---|---|---|---|
|0587|0784|0490|0858|0732|1661|1467|
|1854|1472|1508|1420|1775|1492|2006|
|1643|1630|2294|1697|1329|1592|1606|
|1528|1782|3282|1700|2093|3025|2835|
|2861|4148|5844|7412|9399|9051|8001|
|7350|8993|7633|7783|6869|8159|7247|
|5992|6084|5983|5195|5206|4267|5207|
|4889|5400|5914|6730|7172|5163|5326|
|5165|5742|4671|6015|5527|6471|5100|
|5323|4567|4127|4886|3315|2605|2295|
|1775|1824|1997|1206|1227|1333|0922|
|1154|1004|1020|0990|0903|1166|0911|
|1411|1126|1221|0784|0928|0495| |

FIG. 8 (TABLE 1)

| | | | | | |
|---|---|---|---|---|---|
|35.95|33.72|32.92|32.72|33.03|34.10|
|33.19|34.23|36.52|36.18|34.34|37.09|
|35.57|37.89|38.34|37.59|41.55|36.72|
|36.30|37.16|33.59|33.24|35.19|34.45|
|35.77|36.20|35.59|37.43|34.73|42.92|
|40.19|35.55|38.69|42.54|39.83|44.75|
|46.81|45.95|43.91|42.49|47.02|40.79|
|44.89|43.02|42.48|47.00|42.53|41.77|
|43.47|38.70|42.25|43.51|40.19|42.15|
|41.49|43.99|38.76|40.83|43.89|43.39|
|40.30|49.65|41.55|38.21|38.78|38.12|
|40.75|41.60|36.95|36.09|36.19|36.23|
|40.75|36.90|36.33|36.41|37.15|35.46|
|34.89|35.53|37.29|37.55|37.07|38.28|
|43.59|43.76|35.31|36.60|36.56|34.78|

FIG. 9 (TABLE 2)

| | | | | | |
|---|---|---|---|---|---|
|22.38|23.28|22.65|22.23|22.35|23.45|
|22.57|23.37|23.49|24.69|23.56|25.76|
|23.83|26.33|23.49|25.55|29.02|24.68|
|24.10|26.36|22.86|22.51|24.03|23.72|
|24.99|25.40|22.36|24.35|23.20|31.82|
|28.89|24.02|27.07|25.16|26.27|26.67|
|27.75|28.24|28.98|27.35|27.77|26.22|
|29.86|26.59|28.74|32.52|28.09|25.13|
|28.03|24.90|24.71|29.30|26.43|26.11|
|26.27|30.43|25.77|26.75|29.34|27.64|
|25.53|35.54|27.67|24.71|24.92|24.58|
|24.62|24.64|22.43|22.97|22.93|23.01|
|24.35|23.41|22.63|22.45|22.27|22.30|
|22.10|22.71|22.89|24.02|24.46|24.47|
|23.17|23.54|22.51|22.78|21.72|22.28|

FIG. 10 (TABLE 3)

| | | | | | |
|---|---|---|---|---|---|
| 10.12 | 06.68 | 06.35 | 07.13 | 06.52 | 07.49 |
| 06.57 | 07.01 | 10.03 | 07.37 | 07.58 | 08.26 |
| 06.95 | 08.60 | 11.78 | 08.20 | 09.48 | 08.85 |
| 07.87 | 07.70 | 06.83 | 06.76 | 08.02 | 05.98 |
| 07.67 | 07.40 | 07.87 | 08.28 | 07.95 | 07.02 |
| 07.96 | 07.59 | 08.16 | 11.21 | 08.11 | 13.18 |
| 13.93 | 13.10 | 09.77 | 09.08 | 14.72 | 09.55 |
| 10.07 | 10.40 | 09.81 | 08.33 | 10.42 | 12.50 |
| 10.98 | 08.65 | 13.80 | 08.65 | 09.88 | 12.33 |
| 08.54 | 09.28 | 09.57 | 08.34 | 10.89 | 11.74 |
| 09.19 | 09.65 | 08.57 | 08.58 | 09.30 | 07.38 |
| 12.03 | 13.29 | 09.25 | 09.10 | 08.81 | 08.79 |
| 08.73 | 08.61 | 10.32 | 08.55 | 11.68 | 08.50 |
| 07.31 | 09.12 | 09.90 | 08.98 | 08.33 | 08.03 |
| 08.17 | 11.37 | 09.12 | 10.58 | 08.60 | 08.78 |

FIG. 11 (TABLE 4)

| | | | | | |
|---|---|---|---|---|---|
| 08.94 | 08.16 | 08.79 | 08.60 | 08.27 | 08.90 |
| 10.48 | 09.29 | 08.52 | 10.03 | 10.31 | 11.08 |
| 10.41 | 11.06 | 10.10 | 09.06 | 14.90 | 09.29 |
| 11.21 | 08.88 | 09.76 | 09.81 | 10.29 | 10.76 |
| 08.79 | 08.81 | 09.62 | 10.99 | 09.31 | 13.08 |
| 10.18 | 10.97 | 09.54 | 10.77 | 13.45 | 10.03 |
| 10.38 | 10.96 | 14.53 | 10.76 | 21.37 | 19.17 |
| 10.46 | 13.09 | 14.39 | 11.40 | 08.55 | 12.06 |
| 15.06 | 10.69 | 08.88 | 11.00 | 14.66 | 10.62 |
| 13.07 | 11.68 | 09.85 | 14.60 | 11.47 | 11.68 |
| 14.65 | 10.28 | 13.26 | 09.43 | 10.89 | 10.68 |
| 13.66 | 09.47 | 10.70 | 8.32 | 10.30 | 10.32 |
| 10.15 | 21.36 | 08.95 | 10.06 | 08.28 | 10.20 |
| 08.43 | 09.19 | 09.76 | 10.13 | 08.48 | 09.61 |
| 07.78 | 12.27 | 09.13 | 10.95 | 08.22 | 08.35 |

FIG. 12 (TABLE 5)

| | | | | | | |
|---|---|---|---|---|---|---|
| 2.58 | 2.67 | 2.84 | 2.70 | 2.55 | 2.51 | 3.24 |
| 2.75 | 2.57 | 2.52 | 3.30 | 2.64 | 2.94 | 3.20 |
| 3.07 | 2.42 | 3.69 | 2.49 | 3.43 | 2.44 | 3.11 |
| 2.85 | 2.63 | 3.61 | 2.41 | 2.56 | 2.87 | 2.89 |
| 2.84 | 2.34 | 3.70 | 3.41 | 2.29 | 3.22 | 4.26 |
| 2.62 | 3.54 | 3.16 | 4.33 | 3.25 | 3.74 | 4.29 |
| 2.90 | 3.15 | 3.61 | 3.11 | 2.59 | 3.18 | 3.01 |
| 3.28 | 2.51 | 2.93 | 3.77 | 3.12 | 3.40 | 2.92 |
| 3.11 | 3.43 | 2.97 | 3.12 | 3.32 | 3.29 | 4.47 |
| 2.96 | 3.12 | 3.35 | 3.46 | 2.89 | 3.49 | 2.35 |
| 3.18 | 3.13 | 11.69 | 5.21 | 2.78 | 2.67 | 2.60 |
| 3.09 | 2.45 | 2.85 | 2.77 | 3.22 | 2.57 | 3.01 |
| 2.24 | 4.50 | 2.61 | 3.44 | 2.41 | 2.58 | |

FIG. 13 (TABLE 6)

| | | | | |
|---|---|---|---|---|
| 058.28 | 094.48 | 057.21 | 061.07 | 070.17 |
| 077.36 | 070.51 | 085.28 | 070.03 | 075.43 |
| 080.20 | 091.58 | 084.08 | 072.06 | 062.96 |
| 080.71 | 081.44 | 064.20 | 072.48 | 071.84 |
| 062.35 | 063.32 | 076.46 | 071.22 | 069.78 |
| 072.89 | 070.42 | 105.76 | 100.35 | 108.08 |
| 099.28 | 099.84 | 122.39 | 122.40 | 112.88 |
| 120.79 | 121.09 | 124.37 | 163.68 | 122.83 |
| 195.36 | 153.18 | 122.26 | 144.53 | 111.34 |
| 121.02 | 094.37 | 113.77 | 133.77 | 099.88 |
| 083.11 | 114.19 | 118.35 | 107.72 | 102.33 |
| 113.04 | 102.61 | 118.14 | 102.93 | 094.75 |
| 114.72 | 104.32 | 136.06 | 108.71 | 095.40 |
| 101.48 | 100.88 | 080.25 | 077.42 | 080.48 |
| 075.82 | 078.86 | 272.79 | 120.52 | 067.90 |
| 071.09 | 066.24 | 075.90 | 071.57 | 074.22 |
| 071.17 | 066.37 | 070.62 | 075.28 | 090.91 |
| 088.36 | 071.25 | 065.00 | 069.83 | 070.14 |

FIG. 14 (TABLE 7)

| disp | grd | msg_server | brarchive | oracle | spscl | Other | IOSERVER | disp/msg_server/oracle | grd/spscl/other | disk writes/ sec | disk reads/sec |
|---|---|---|---|---|---|---|---|---|---|---|---|
| 63.76 | 0.09 | 0.09 | 0 | 190.21 | 2.87 | 129.93 | 0.55 | 254.06 | 132.89 | 1.12 | 0.01 |
| 44.04 | 0.09 | 0.11 | 0 | 128.46 | 2.74 | 144.59 | 0.43 | 172.61 | 147.42 | 13.49 | 0.16 |
| 7.77 | 0.09 | 0.17 | 0 | 128.98 | 2.79 | 122.98 | 1.75 | 136.92 | 125.86 | 6.53 | 0.07 |
| 11.82 | 0.1 | 0.17 | 0 | 168.49 | 2.89 | 127.6 | 0.56 | 180.48 | 130.59 | 27.61 | 0.27 |
| 48.53 | 0.07 | 0.17 | 0 | 141.78 | 2.81 | 129.88 | 0.49 | 190.48 | 132.76 | 9.73 | 0.16 |
| 8.83 | 0.07 | 0.11 | 0 | 87.85 | 2.78 | 100.24 | 0.39 | 96.79 | 103.09 | 3.94 | 0.09 |
| 9.65 | 0.09 | 0.13 | 0 | 101.65 | 2.72 | 104.63 | 0.55 | 111.43 | 107.44 | 0.19 | 0 |
| 12.98 | 0.08 | 0.13 | 0 | 110.31 | 2.77 | 102.95 | 0.55 | 123.42 | 105.8 | 3.16 | 0.08 |
| 47.59 | 0.07 | 0.07 | 0 | 145 | 2.72 | 111.32 | 0.48 | 192.66 | 114.11 | 2.44 | 0.04 |
| 52.83 | 0.08 | 0.09 | 0 | 147.76 | 2.74 | 96.18 | 0.45 | 200.68 | 99 | 3.54 | 0.08 |
| 58.58 | 0.08 | 0.1 | 0 | 145.48 | 2.75 | 126.09 | 0.44 | 204.16 | 128.92 | 3.79 | 0.08 |
| 54.36 | 0.08 | 0.1 | 0 | 140.36 | 2.73 | 135.66 | 0.5 | 194.82 | 138.47 | 2.72 | 0.06 |
| 26.33 | 0.09 | 0.16 | 0 | 104.34 | 2.76 | 140.55 | 0.48 | 130.83 | 143.4 | 0.2 | 0 |
| 8.7 | 0.08 | 0.1 | 0 | 75.2 | 2.73 | 130.12 | 0.44 | 84 | 132.93 | 0.21 | 0 |
| 10 | 0.09 | 0.13 | 0 | 84.3 | 2.74 | 129.19 | 0.53 | 94.43 | 132.02 | 3.51 | 0.08 |
| 11.14 | 0.09 | 0.09 | 2.85 | 84.28 | 2.75 | 129.68 | 0.53 | 95.51 | 132.52 | 0.21 | 0.02 |
| *19.7* | *0.11* | *0.2* | *3.2* | *117.56* | *2.87* | *151.48* | *0.45* | *137.46* | *154.46* | *2.1* | *27* |
| 35.04 | 0.07 | 0.13 | 0.03 | 96.25 | 2.84 | 146.31 | 0.44 | 131.42 | 149.22 | 0.73 | 23.6 |
| 12.29 | 0.07 | 0.06 | 0 | 76.65 | 2.72 | 131.38 | 0.52 | 89 | 134.17 | 0.22 | 0 |
| 13.55 | 0.09 | 0.04 | 0 | 65.19 | 2.71 | 134.13 | 0.5 | 78.78 | 136.93 | 0.16 | 0 |
| ... | ... | ... | ... | ... | ... | ... | ... | ... | ... | ... | ... |

FIG. 15 (TABLE 8)

| Correlation Coefficient | Wkl 1 | Wkl 2 |
|---|---|---|
| 0.965761 | oracle | msg_server |
| 0.728880 | msg_server | disp |
| 0.703575 | oracle | disp |
| 0.590550 | other | spscl |
| 0.540102 | spscl | grd |
| 0.451430 | msg_server | grd |
| 0.440811 | msg_server | brarchive |
| 0.425671 | oracle | brarchive |
| 0.338354 | oracle | grd |
| 0.321722 | grd | disp |
| 0.271860 | disp | brarchive |
| 0.267692 | grd | brarchive |
| 0.192810 | other | grd |
| 0.094741 | spscl | brarchive |
| 0.060713 | IOSERVER | other |
| 0.041600 | IOSERVER | grd |
| 0.009877 | spscl | msg_server |
| 0.006852 | IOSERVER | spscl |
| -0.048174 | spscl | oracle |
| -0.052433 | IOSERVER | brarchive |
| -0.061215 | IOSERVER | disp |
| -0.064147 | IOSERVER | msg_server |
| -0.076248 | IOSERVER | oracle |
| -0.103297 | other | brarchive |
| -0.405015 | other | msg_server |
| -0.429538 | spscl | disp |
| -0.468848 | other | disp |
| -0.474270 | other | oracle |

FIG. 16 (TABLE 9)

| Workload | Reads | Writes |
|---|---|---|
| {brarchive} | 0.532 | 0.254 |
| {msg_server,oracle,disp} | 0.402 | 0.508 |
| {grd,spscl,other} | -0.057 | -0.204 |
| {IOSERVER} | -0.056 | -0.072 |

FIG. 17 (TABLE 10)

SYSTEM AND METHOD FOR AUTOMATIC WORKLOAD CHARACTERIZATION

PRIORITY CLAIM

This application claims the benefit of U.S. Provisional Application No. 60/254,340 entitled "SYSTEM AND METHOD FOR AUTOMATIC WORKLOAD CHARACTERIZATION," filed Dec. 8, 2000.

BACKGROUND OF THE INVENTION

1. Field of the Invention

This invention relates generally to computer systems and software. More particularly, the invention relates to workload characterization for capacity planning and performance modeling.

2. Description of the Related Art

The data processing resources of business organizations are increasingly taking the form of a distributed computing environment in which data and processing are dispersed over a network comprising many interconnected, heterogeneous, geographically remote computers. Such a computing environment is commonly referred to as an enterprise computing environment, or simply an enterprise. Managers of the enterprise often employ software packages known as enterprise management systems to monitor, analyze, and manage the resources of the enterprise. Enterprise management systems may provide for the collection of measurements, or metrics, concerning the resources of individual systems. For example, an enterprise management system might include a software agent on an individual computer system for the monitoring of particular resources such as CPU usage or disk access. U.S. Pat. No. 5,655,081 discloses one example of an enterprise management system.

Workload characterization is an important and basic step for performance modeling and capacity planning. Traditional approaches for workload characterization often require sophisticated and time-consuming user assistance. With increasing amounts of software and hardware to manage, IT professionals and performance analysts have less time to do detailed analyses of what is going on inside application boxes and of the interactions between hardware and software. Nonetheless, they and their managers want to know how their applications, represented/characterized by workloads, are performing now and how they will perform in the future.

Traditionally, workload characterization involves many steps. First, one has to partition the applications on a system into meaningful activities (e.g., workloads). Second, one maps each process that has run on the system to one or more of these activities. Third, one uses this mapping and the metrics collected by the operating system over a fixed period of time to partition the activity on the system into workloads. Once the system resources consumed by each workload are known, it is possible to infer when potential performance problems might occur as workloads grow and/or other system conditions change.

However, there are several problems with this scenario. First, the need to find workloads and to determine which processes belong to which workload can be complicated and may take an inordinate amount of a user's time. Also, the information provided by the operating system is often incomplete and/or unreliable. For instance, with many operating systems, it is often very difficult or impossible to determine how many blocks of data a particular process wrote to disk. And it is even rarer that one can determine which disks that process used. Furthermore, faulty definitions of application workloads and their consumption of resources may lead to invalid predictions of future application performance and system bottlenecks.

Therefore, it is desirable to provide an improved system and method for workload characterization.

SUMMARY OF THE INVENTION

The present invention provides various embodiments of a method and system for automatic workload characterization. Data are collected and compared over many intervals to see what system activities happen together. For example, if a particular process is always active at the same time that a disk is being used, then it is reasonable to assume that that process is using that disk. As another example, when a transaction log file is available (this is often true for e-businesses as well as other businesses), one can see which processes are active during certain transactions and infer that these transactions used those processes.

Using this general technique, workloads may be constructed automatically, without the need of significant assistance or intervention by a user assistance. Further, it may also be possible to determine with much greater precision which resources are used by which workloads. A number of algorithms are presented for automatically classifying workloads and for determining what resources a workload used even when the operating system does not provide the data. The algorithms use statistics to find the processes and other resources that worked together to complete each type of transaction. As used herein, the term "transaction" is intended to refer to any work supporting a business activity, such as an entry in a log file, a Web hit, and/or a process (e.g., a computer process) associated with a transaction. For Web-based commerce, business activity data is logged and readily accessible. Automatic workload characterization may also be performed without a log file.

By observing a computer over a period of time, it may be possible to discern correlations that imply use relationships. This concept can be used to find the machine resources "used" by log entries, the machine resources used by workloads and how one workload "uses" another workload. These achieve a two-fold purpose. First, it is possible to find workloads automatically. Second, once workloads have been determined, it is possible to get a more accurate relationship between resources and workloads than is traditionally possible.

A method for automatic workload characterization as follows is therefore provided. Transactions performed in a computer system may be logged. The log of transactions comprises a timestamp for each transaction. Resource usage in the computer system may be logged. The log of resource usage comprises one or more periods of time during which each of a plurality of resources is used, and the log of resource usage comprises a plurality of system performance metrics which reflect resource consumption by one or more processes that performed the transactions. The timestamps in the log of transactions may be compared to the periods of time in the log of resource usage. It may be determined which transactions used which resources as a result of the comparing the timestamps in the log of transactions to the periods of time in the log of resource usage. One or more workloads may be determined based on said determining which transactions used which resources. Heuristics may be used to group processes into workloads.

BRIEF DESCRIPTION OF THE DRAWINGS

The objects and advantages of the invention will become apparent upon reading the following detailed description and upon reference to the accompanying drawings in which:

FIGS. 8 through 17 are tables showing sample data; and

Figure 1:
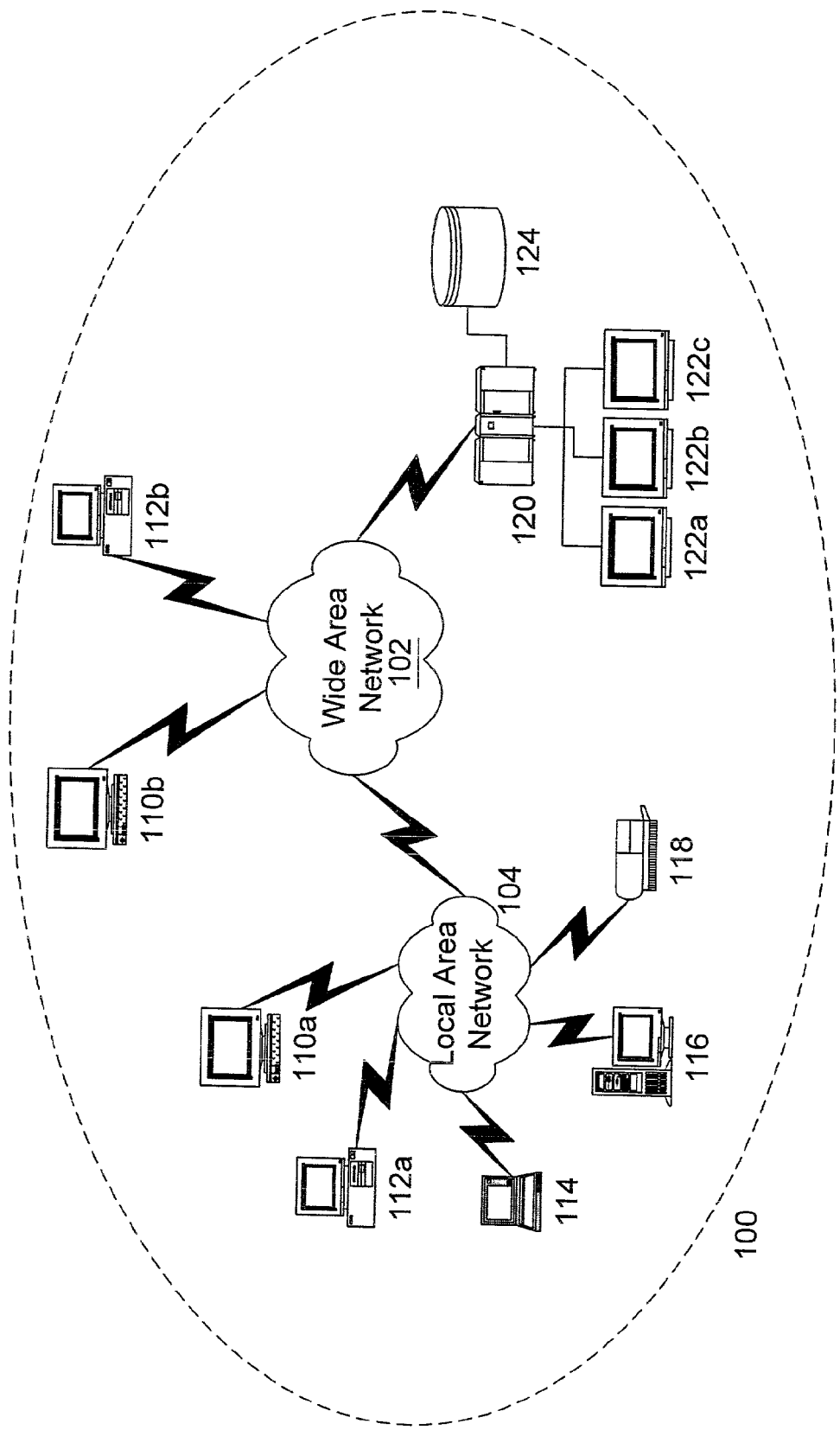
FIG. 1 is a network diagram of an illustrative enterprise computing environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

U.S. Pat. No. 5,655,081 titled "System for Monitoring and Managing Computer Resources and Applications Across a Distributed Environment Using an Intelligent Autonomous Agent Architecture" is hereby incorporated by reference as though fully and completely set forth herein.

U.S. Pat. No. 5,761,091 titled "Method and System for Reducing the Errors in the Measurements of Resource Usage in Computer System Processes and Analyzing Process Data with Subsystem Data" is hereby incorporated by reference as though fully and completely set forth herein.

FIG. 1 illustrates an enterprise computing environment according to one embodiment of the present invention. An enterprise 100 comprises a plurality of computer systems which are interconnected through one or more networks. Although one particular embodiment is shown in FIG. 1, the enterprise 100 may comprise a variety of heterogeneous computer systems and networks which are interconnected in a variety of ways and which run a variety of software applications.

One or more local area networks (LANs) 104 may be included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 1, the enterprise 100 includes one LAN 104. However, in alternate embodiments the enterprise 100 may include a plurality of LANs 104 which are coupled to one another through a wide area network (WAN) 102. A WAN 102 is a network that spans a relatively large geographical area.

Each LAN 104 comprises a plurality of interconnected computer systems and optionally one or more other devices: for example, one or more workstations 110*a*, one or more personal computers 112*a*, one or more laptop or notebook computer systems 114, one or more server computer systems 116, and one or more network printers 118. As illustrated in FIG. 1, the LAN 104 comprises one of each of computer systems 110*a*, 112*a*, 114, and 116, and one printer 118. The LAN 104 may be coupled to other computer systems and/or other devices and/or other LANs 104 through a WAN 102.

One or more mainframe computer systems 120 may optionally be coupled to the enterprise 100. As shown in FIG. 1, the mainframe 120 is coupled to the enterprise 100 through the WAN 102, but alternatively one or more mainframes 120 may be coupled to the enterprise 100 through one or more LANs 104. As shown, the mainframe 120 is coupled to a storage device or file server 124 and mainframe terminals 122*a*, 122*b*, and 122*c*. The mainframe terminals 122*a*, 122*b*, and 122*c* access data stored in the storage device or file server 124 coupled to or comprised in the mainframe computer system 120.

The enterprise 100 may also comprise one or more computer systems which are connected to the enterprise 100 through the WAN 102: as illustrated, a workstation 110*b* and a personal computer 112*b*. In other words, the enterprise 100 may optionally include one or more computer systems which are not coupled to the enterprise 100 through a LAN 104. For example, the enterprise 100 may include computer systems which are geographically remote and connected to the enterprise 100 through the Internet.

Figure 2:
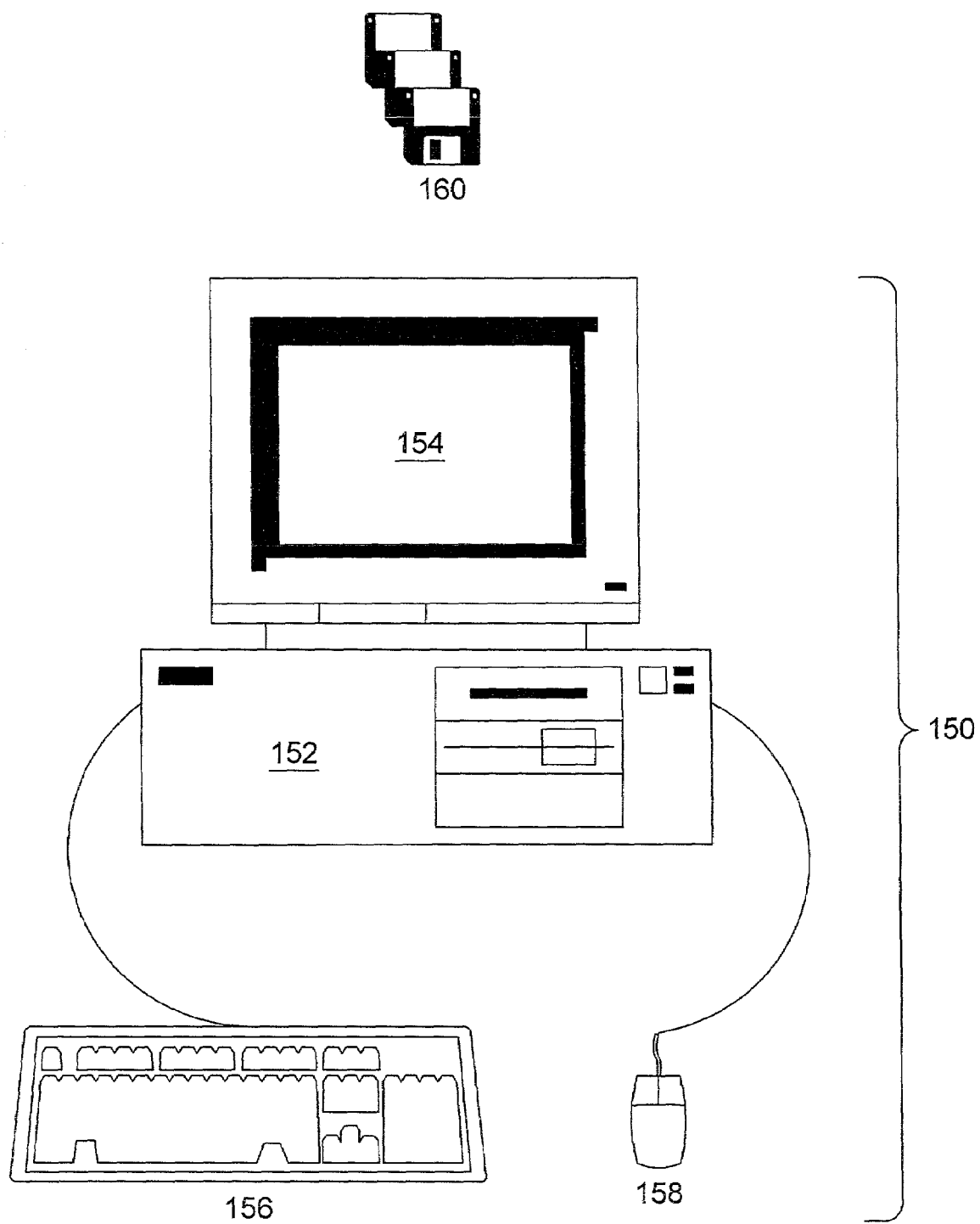
FIG. 2 is an illustration of a typical computer system with computer software programs which is suitable for implementing various embodiments.

The present invention preferably comprises computer programs 160 stored on or accessible to each computer system in the enterprise 100. FIG. 2 illustrates computer programs 160 and a typical computer system 150. Each computer system 150 typically comprises components such as a CPU 152, with an associated memory media. The memory media stores program instructions of the computer programs 160, wherein the program instructions are executable by the CPU 152. The memory media preferably comprises a system memory such as RAM and/or a nonvolatile memory such as a hard disk. The computer system 150 further comprises a display device such as a monitor 154, an alphanumeric input device such as a keyboard 156, and optionally a directional input device such as a mouse 158. The computer system 150 is operable to execute computer programs 160.

When the computer programs are executed on one or more computer systems 150, an enterprise management system 180 may be operable to monitor, analyze, and manage the computer programs, processes, and resources of the enterprise 100. Each computer system 150 in the enterprise 100 executes or runs a plurality of software applications or processes. Each software application or process consumes a portion of the resources of a computer system and/or network: for example, CPU time, system memory such as RAM, nonvolatile memory such as a hard disk, network bandwidth, and input/output (I/O). The enterprise management system 180 may permit users to monitor, analyze, and manage resource usage on heterogeneous computer systems 150 across the enterprise 100.

Figure 3:
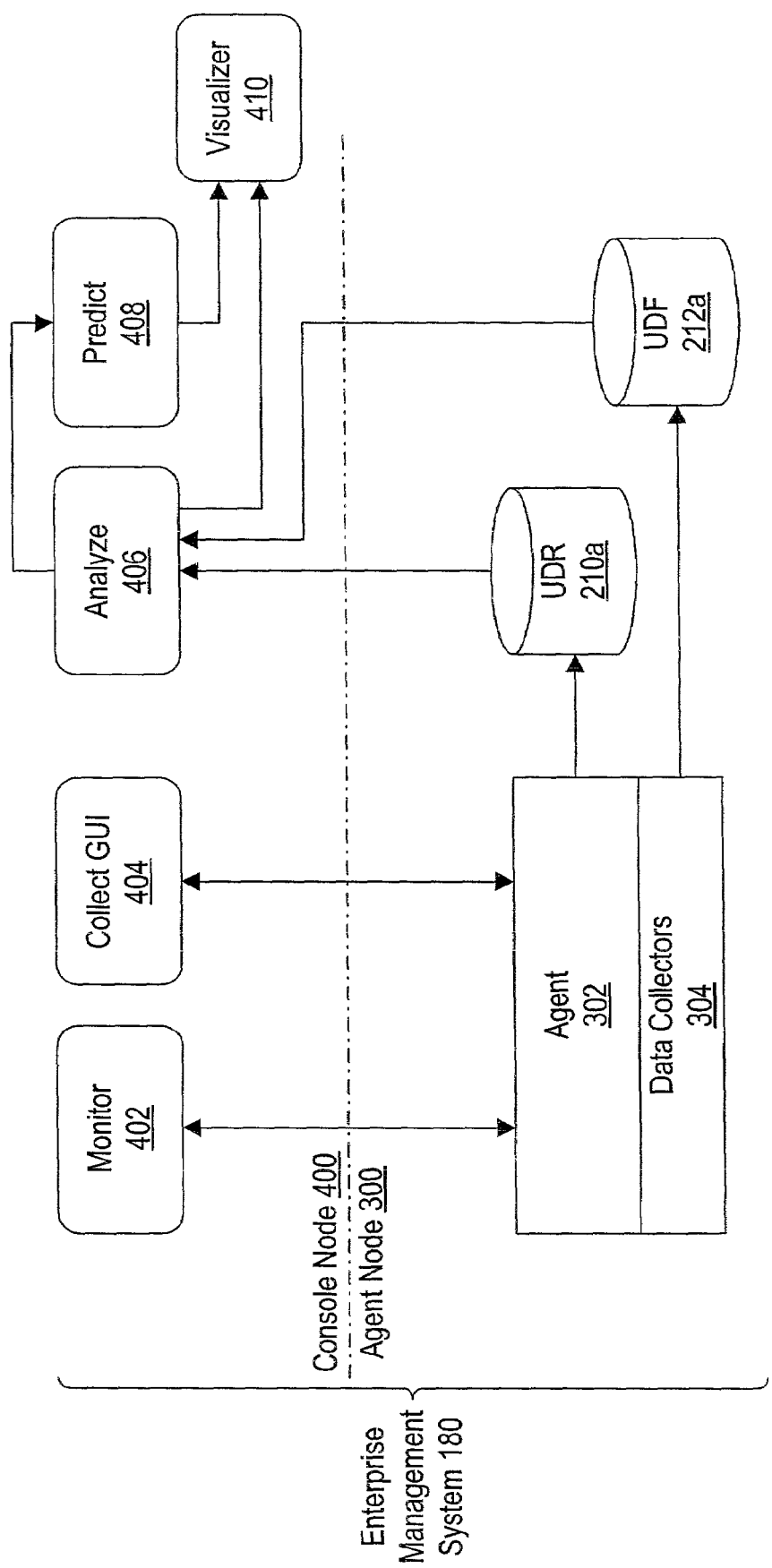
FIG. 3 is a block diagram illustrating an overview of an enterprise management system according to one embodiment.

The system and method for automatic workload characterization may be utilized in the context of many different architectures for monitoring and managing computer systems. FIG. 3 shows an overview of one example of an enterprise management system 180 according to one embodiment. The enterprise management system 180 may include at least one console node 400 and at least one agent node 300, and it may include a plurality of console nodes 400 and/or a plurality of agent nodes 300. In general, an agent node 300 executes software to collect metric data on its computer system 150, and a console node 400 executes software to monitor, analyze, and manage the collected metrics from one or more agent nodes 300. A metric is a measurement of a particular system resource. For example, in the preferred embodiment, the enterprise management system 180 collects metrics such as CPU, disk I/O, file system usage, database usage, threads, processes, kernel, registry, logical volumes, and paging. Each computer system 150 in the enterprise 100 may include a console node 400, an agent node 300, or both a console node 400 and an agent node 300. In one embodiment, server computer systems may include agent nodes 300, and other computer systems may also include agent nodes 300 as desired, e.g., file servers, print servers, e-mail servers, and internet servers. The console node 400 and agent node 300 may be characterized by an end-by-end relationship: a single console node 400 may be linked to a single agent node 300, or a single console node 400 may be linked to a plurality of agent nodes 300, or a plurality of console nodes 400 may be linked to a single agent node 300, or a plurality of console nodes 400 may be linked to a plurality of agent nodes 300.

In one embodiment, the console node 400 may include four user-visible components: a Monitor component 402, a Collect graphical user interface (GUI) 404, an Analyze component 406, and a Predict component 408. In one embodiment, all four components 402, 404, 406, and 408 of the console node 400 are part of the "BEST/1 FOR DISTRIBUTED SYSTEMS" software package or the "PATROL" software package, all available from BMC Software, Inc. The agent node 300 may include an Agent 302, one or more data collectors 304, Universal Data Repository (UDR) history files 210a, and Universal Data Format (UDF) history files 212a. In alternate embodiments, the agent node 300 includes either of UDR 210a or UDF 212a, but not both. The Monitor component 402 may allow a user to monitor, in real time, data that is being collected by an Agent 302 and being sent to the Monitor 402. The Collect GUI 404 may be employed to schedule data collection on an agent node 302. The Analyze component 406 may take historical data from a UDR 210a and/or UDF 212a to create a model of the enterprise 100. The Predict component 408 may accept the model from the Analyze component 406 and allow a user to alter the model by specifying hypothetical changes to the enterprise 100. Analyze 406 and Predict 408 may create output in a format which can be understood and displayed by a Visualizer tool 410. In one embodiment, Visualizer 410 is the "BEST/1-VISUALIZER" available from BMC Software, Inc. In one embodiment, Visualizer 410 is also part of the console node 400.

The Agent 302 may control data collection on a particular computer system and report the data in real time to one or more Monitors 402. In one embodiment, the Agent 302 is the part of the "BEST/1 FOR DISTRIBUTED SYSTEMS" software package available from BMC Software, Inc. The data collectors 304 may collect data from various processes and subsystems of the agent node 300. The Agent 302 may send real-time data to the UDR 210a, which is a database of historical data in a particular data format. The UDF 212a is similar to the UDR 210a, but the UDF 212a uses an alternative data format and is written directly by the data collectors 304.

Methods for Identifying Related Events

It is important to note that finding the processes related to a workload is the means to a goal and not the goal itself. In one embodiment, the goal is to find the amount of resources needed to complete a transaction. The system and method discussed herein use statistical data analysis to relate logs of activities with the consumption of resources. Not only does this procedure tend to require less user input, but it also has the potential of producing better information.

A second method that is more closely related to traditional techniques is also discussed herein. This method uses the relationship among processes to determine which processes belong in the same workloads. Some user assistance can be useful in this case because the suggested workloads may need to be modified. The main advantage of the second method is that it does not require log files or similar information. And, secondarily, when log files exist, the second method may provide a useful way of validating the results found using the first technique.

Figure 18:
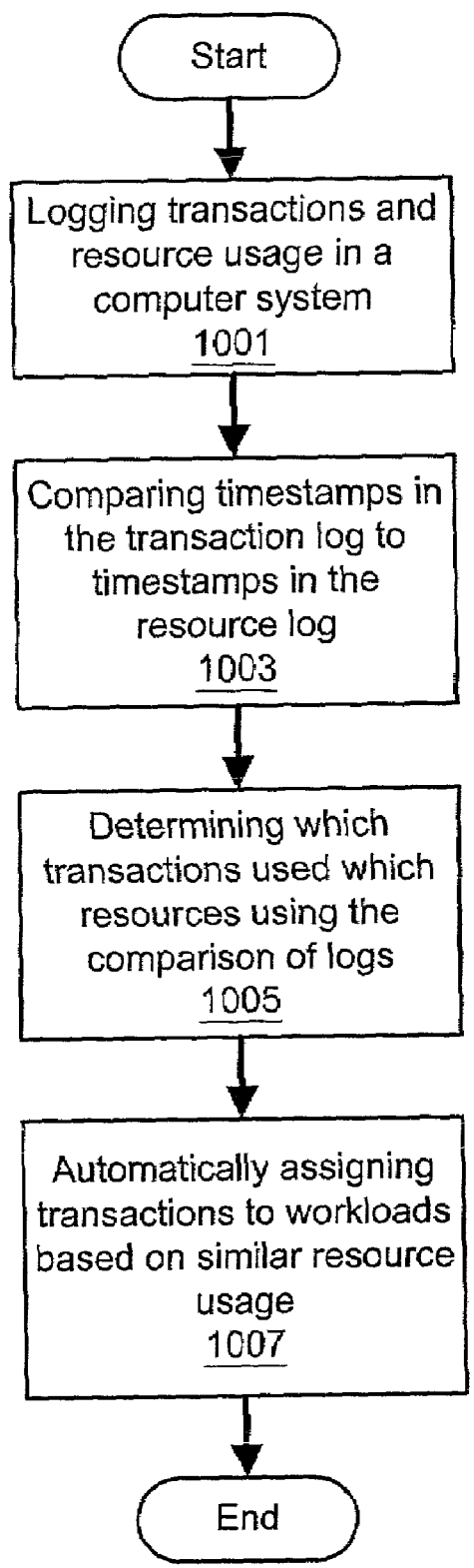
FIG. 18 is a flowchart illustrating a method of automatic workload characterization according to one embodiment.

FIG. 18 is a flowchart illustrating a method of automatic workload characterization according to one embodiment. Specific details of the method are discussed in the remainder of this detailed description. In 1001, transactions and resource usage in a computer system may be logged in a transaction log and a resource log, respectively. As used herein, the term "transaction" is intended to refer to any work supporting a business activity, such as an entry in a log file, a Web hit, and/or a process (e.g., a computer process) associated with a transaction. Both logs may include timestamps which indicate the time at which particular events took place. In 1003, the timestamps in the transaction log may be compared to the timestamps in the resource log. In 1005, it may be determined which transactions used which resources based on the log comparison of 1003. In 1007, in one embodiment, transactions may be automatically assigned (i.e., classified) to workloads based on similar resource usage and the relationships among them.

In a preferred embodiment, in 1003, the timestamps may be compared by creating a histogram for each transaction log and resource log. In one embodiment, in 1005 the determination of which transactions used which resources may be made by computing a correlation coefficient between the histogram of each transaction log and each resource log of 1003. In one embodiment, in 1007, the transactions may be assigned to workloads by assigning to the workload for each transaction type the resources that have high correlation coefficients.

Definitions

In the following definitions, let X and Y be any two random variables with means (averages) $\bar{x}$ and $\bar{y}$, and positive variances $\sigma_x^2$ and $\sigma_y^2$. A typical example of the random variables that may be compared is the CPU consumption of two different processes. As another example, process page fault counts and disk activity may be compared.

Definition 1. Variance: Let X be a random variable with a distribution $F(x):=Pr(X \leq x)$, the variance of the distribution is defined by $$\sigma_x^2 := E([X-E(X)]^2) := \overline{x^2} - \overline{x}^2,$$

where $E(X) \equiv \overline{x}$ is the expectation (mean) of X. The variance is a measure of the "spread" or "scattering" of a distribution.

Definition 2. Covariance: Assume that X and Y have finite variances. Their covariance is defined by $$COV(X, Y) = E(XY) - \overline{xy}.$$

From the above definition we know that if X and Y are independent, i.e., $E(XY)=E(X)E(Y)$, then $COV(X, Y)=0$. (The converse is not true.) Since the covariance is not a normalized number, when it is not equal to 0, we don't know how closely the two random variables are related. If we normalize the two variables by $$X^* = (X - \overline{x})/\sigma_x$$

$$Y^* = (Y - \overline{y})/\sigma_y$$

then they, X* and Y*, have mean 0 and variance 1, which lead to a more informative relationship indicator, Correlation Coefficient.

Definition 3. Correlation Coefficient: The correlation coefficient of X and Y is defined by $$C(X, Y) = COV(X^*, Y^*) = \frac{COV(X, Y)}{\sigma_x \sigma_y}.$$

In other words, the correlation coefficient of two random variables is the covariance of the normalized two variables. Note that, $-1 \leq C(X, Y) \leq 1$. $C(X, Y) = \pm 1$ if and only if Y and X are related linearly, i.e., $Y=aX+b$.

Note that the correlation coefficient is independent of the origins and units of measurements. In other words, for any constants, a, b, c, d, with a>0, c>0, we have $$C(aX+b, cY+d) = C(X, Y).$$

This property allows us to manipulate the scale of the data for a better visual representation of the relationship among performance metrics. One way to scale the measured data is to normalize it, so that the values are between 0 and 1. For instance, let $$a = 1/(X_{max} - X_{min})$$

and $$b = -X_{min}/(X_{max} - X_{min}), \quad (1)$$

where $X_{max}$ ($X_{min}$) is the largest (smallest) value of the data, then the linear transformation $$X' = aX + b$$

will normalize the data, but not change the correlation coefficient. In other words, $C(X', Y) = C(X, Y)$. Of course, Y can also be similarly changed. Intuitively, high positive correlation of two random variables implies the peaks (and valleys) of their values tend to occur together. A linear transformation will not change this visual property. Thus, the automatic workload characterization method based on correlation coefficient is not sensitive to the magnitude of the data. However, it is sensitive to the time phase of the data. For this reason, it is recommended that the measurement interval not be too small because there can be a delay between the various activities that complete a transaction. As a rule of thumb, it is recommended that the interval be greater than 20 times the average delay at different resources and/or devices.

Automatic Characterization of Workloads by "Business Curves"

E-business operation provides many opportunities for automatically finding workloads that directly capture the computing resource demands needed to support various types of business transactions. By definition, every e-business transaction uses some (often many) computer resources. These might include CPU, networks, and disks. Since the set of resource demands for a particular type of transaction is more or less constant over all such transactions, it is to be expected that there is a high correlation between the set of such transactions and the resources they consume. The idea is to correlate the log of transactions with the use profiles of each computer resource. It may be inferred that those resources whose use profiles parallel the timestamps in the log file are the ones used by the transaction. FIG. 18 is a flowchart which illustrates this method according to one embodiment.

This idea, of course, is not restricted to e-business. Any time that transactions are logged, the same idea can be applied. Further, it is not necessary that there be only one activity of interest. As long as the activities have sufficiently different use profiles, it may be possible to determine how much of each resource is needed to support each activity. The computation is simplest, if there are periods in which only one activity is occurring. If we look only at such periods, we may arrive at a baseline value for the resources needed for each transaction. When there are no periods (or few) with only one active transaction, then the problem is more complex and we describe how to proceed below.

We can abstract a sequence of business transactions as a set of events of a business activity B, $$B = \{B(t_1), B(t_2), \ldots, B(t_n)\},$$

that take place within a given time interval $[t_1, t_n]$. What we are interested in here are the quantitative representations of these events, denoted $b(t_1), b(t_2), \ldots, b(t_n)$, respectively. For example, selling books through the World Wide Web is a business activity, and its quantitative representations could be the number of hits on the Web sites (servers) and/or the numbers of books sold. Note that although these two representations are closely related to each other and to the underlying activity, they are not the same. Choosing the right quantitative representation of a business activity will improve the resulting model, but in most cases any reasonable data set will do.

Now consider a set of system performance metrics, $M = \{m_1, m_2, \ldots, m_k\}$, for the same time interval $[t_1, t_n]$. One gets a series of measurements:

$$m_1(t_1), m_1(t_2), \ldots, m_1(t_n),$$

$$m_2(t_1), m_2(t_2), \ldots, m_2(t_n),$$

$$m_k(t_1), m_k(t_2), \ldots, m_k(t_n).$$

The goal now is to find which of these series correlates highly with $b(t_1), b(t_2), \ldots, b(t_n)$.

A System and Method for Establishing the Relationship

In one embodiment, the following steps may be performed to establish the relationship. Given a quantitative business transaction representation b and a set of performance metrics M:

1. Compute the Correlation Coefficient, C(b, i), for each metric, $m_i$, and business activity, b, pair.
2. Form a supporting set, $S_b=\{i|C(b, m_i)>c\}$, where c, 0<c<1, is the value that determines how strongly that correlation would be among those selected and the business activity. The larger the value c, the stronger the correlation.
3. Create a workload, based on the set $S_b$, whose processes correlate to the metrics in supporting set $S_b$ and/or their resource consumption reflected by the performance metrics that has correlation (correlation coefficient greater than c) with the business activity.

It is easy to modify the above method for grouping correlated candidate workloads together to form aggregated workloads. It is also easy to extend the method to handle multiple business activities and identify the related metrics.

A Long Example

We give an example showing how correlation coefficients can be used for performance modeling.

Example 1

Table 1 (FIG. 8) is a straightforward count of the number entries in a log file of transactions on a web server. The data represents the number of entries in the log file for 90 successive fifteen-minute intervals. For the same time interval, the reported CPU utilization of the two-processor machine is shown in Table 2 (FIG. 9). The correlation coefficient between these two lists is 0.73, and it may be inferred that for each log file entry there was a significant amount of CPU activities. The amount is estimated below.

This information may be used to construct a model. The model will be an abstraction of one interval, but the above numbers from all the intervals may be used to establish the relationship between the log file entries and CPU usage. This relationship may be estimated using a variant of the formula described below. In this example, CPU utilization and the log file activity have a correlation coefficient of 0.73. It is desirable to distribute CPU utilization between the activity recorded in the log and the other activity.

Let L be the CPU utilization that supports the activity reflected in the log file (Table 1), and U be the total CPU utilization (recorded in Table 2). L is computed as (see the next section for an explanation of this formula.):

$$L=0.73^2 U/(0.73^2+(1-0.73)^2)=0.88U.$$

Now pick the fifth ($5^{th}$) interval in the Tables (highlighted) and construct a model for it. During that interval, the total utilization was 33.03 (Table 2) and the log file had 732 entries (Table 1). Thus, a model may be constructed in which the activities that support the web server utilized 0.88*33.03=29.1% (out of 200%) of the CPU. On a per transaction basis, this comes to 29.1/732=0.04%.

How can we know if this number has any relationship to reality? Sometimes it is difficult to confirm the validity of this relationship, but we can confirm it often enough using different methods to tell that it yields good estimates. In this case, we can get a good confirmation of this estimate by breaking down the work on the two-processor machine by the "users" who generated it. Here, processes owned by the pseudo-user http had the following CPU utilization profile for the same 15-minute time interval (Table 3, shown in FIG. 10).

This profile of process (workload) http has a correlation coefficient of 0.67 with the profile of log file entries. Similarly, pat was another pseudo-user that had a high correlation with the Web server log file entries. They had a correlation coefficient of 0.46. Table 4 (FIG. 11) shows CPU utilization of workload pat on a two-processor machine. Each number in the table represents the average CPU utilization during a 15-minute interval.

Interestingly, if we sum the utilizations of both pseudo-user, http and pat, the resulting profile has a correlation coefficient of 0.73, which means that, to a substantial extent, a log file entry that was not related to one of these users was related to the other. It is not, of course, a coincidence that this number (with two workloads http and pat) is the same as the correlation of log entries and CPU utilization (Table 1 and 2): collectively the two groups of processes generated a high fraction of the machine's activity as the two pseudo-users together used 28.9% of the machine. It turns out that these were the only two users of the machine that had a significantly high correlation with the log file and it is significant that 28.9% is close to the estimate computed above (29.1%).

Figure 4:
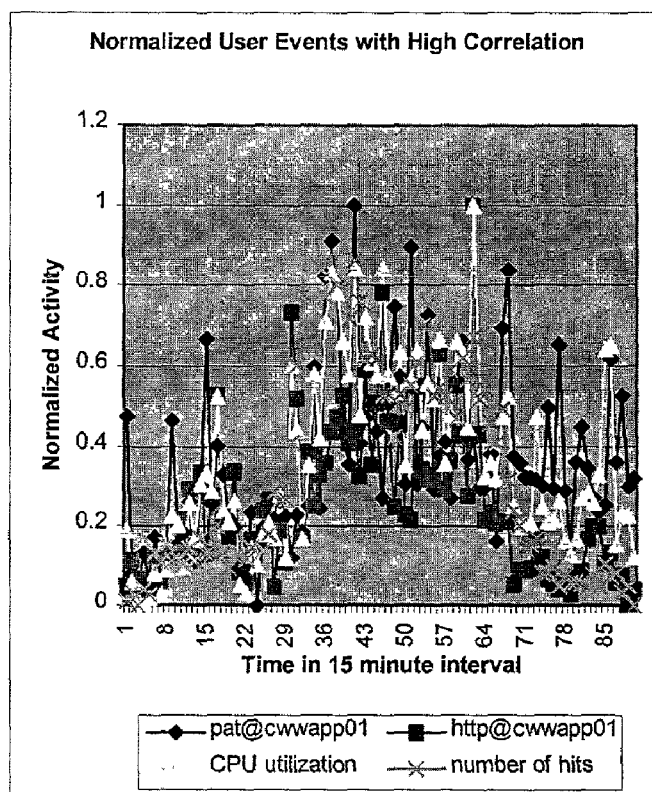
FIG. 4 shows an example of the relative activities, after normalization, of the number of hits at the Web server, the total CPU utilization, and the utilization by the processes http and pat, respectively.

FIG. 4 shows the relative activities, after normalization using linear transformation (1) on the numbers in the four Tables, of the number of hits at the Web server, the total CPU utilization, and the utilization by the processes http and pat, respectively. We can clearly see that those numbers have very similar trending or pattern: their peaks and valleys tend to occur closely together. In FIG. 4, the Correlation Coefficient (CC) of number of hits and CPU utilization is 0.73. The CC of workload http and number of hits is 0.67. And the CC of workload pat and number of hits is 0.46.

Figure 5:
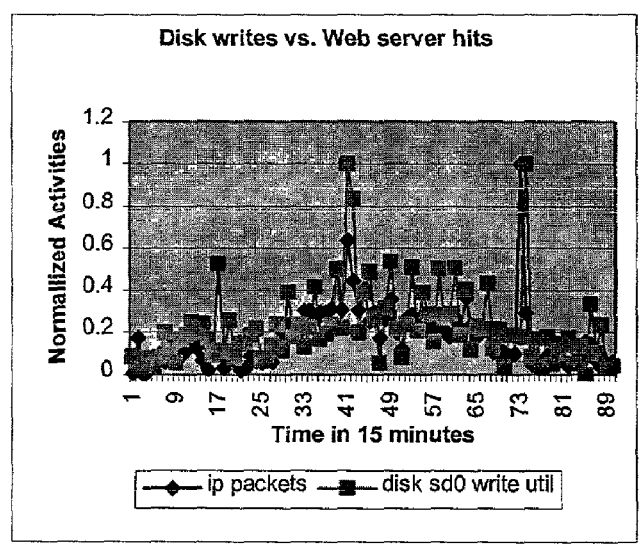
FIG. 5 shows an example of normalized activities of disk writes and number of hits at a Web server.
Figure 6:
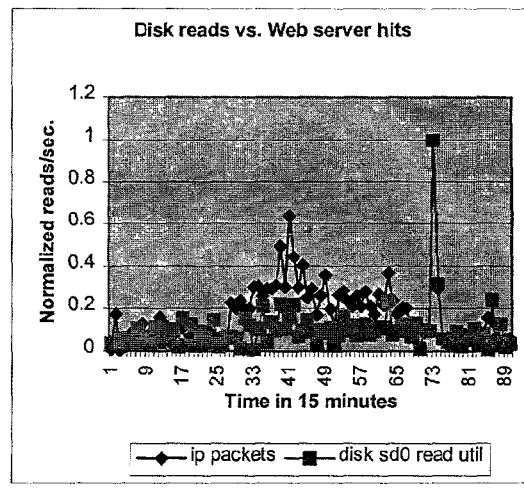
FIG. 6 shows an example of normalized activities of disk reads and number of hits at a Web server.

Disk utilization may be included in the model by looking at the usage profile of each of the disks on the machine. In our example, one of the disks had the profile for pages written per second for the same 15-minute time interval as shown in Table 5 (FIG. 12) and for pages read per second as shown in Table 6 (FIG. 13):

The log file entry profile has a correlation coefficient of 0.44 with the first set of numbers and 0.13 with the second. FIGS. 5 and 6 show the relative disk activities with the number of Web hit counts, after normalization using linear transformation (1).

In FIG. 5, the normalized activities of disk writes and number of hits at a Web server are shown. It is clear from this picture that disk writes and number of hits are highly correlated with their peaks (and valleys) of the disk write rate and Web server hit count occurring together. The Correlation Coefficient (CC) is 0.44.

In FIG. 6, the normalized activities of disk reads and number of hits at a Web server are shown. It is clear from this picture that disk reads and the number of hits are less correlated because the peaks of the disk read rate and Web server hit count do not occur together. The correlation coefficient is 0.13.

Thus, if we simplify and assume that this is the only disk on the machine, we would end up with a model that looked something like:

Workload Webtransaction
Transactions per Hour 2928
CPU seconds per Transaction 0.36
Writes per Transaction 3.86
Reads per Transaction 0.068
IP Packets per Transaction 63.0

Workload Other
Transactions per Hour 1350
CPU Seconds per Transaction 0.1
Writes per Transaction 13.6
Reads per Transaction 6.65
IP Packets per Transaction 50.5

The transaction count in the Webtransaction workload is simply 4 times the 15 minute hit count taken from the log (4*732=2928). We estimated that this workload utilized 88% of the total used CPU. The data says that the CPU utilization was 33.03% during the chosen interval. CPU second per Web transaction is computed by 0.3303*0.88*3600/2928=0.36, where 3600 is the number of seconds in an hour.

For disk writes we plug the correlation 0.44 into the formula (2) and compute that 0.38 of disk writes will go to this workload. Since 8.27 pages were written per second, this translates to 3.86 pages per transaction. Disk reads may be computed similarly.

The CPU time per transaction for the Other workload may be chosen arbitrarily. Once chosen, the number of transaction may be computed so that all the CPU is accounted for. Since the total disk reads and writes attributable to the workload is known, it is then a simple division to arrive at the reads and writes per transaction.

Note that this model was computed without using process information. It was only referred to above to help validate our correlations.

As shown in the model, other resources, such as IP packets, could also be added. This was computed from the usage profile of IP packets (in packets/second) during a 15-minute time interval as shown in Table 7 (FIG. 14).

This profile has a correlation coefficient with the log file of 0.62. So we will allocate $$0.62^2/(0.62^2+(1-0.62)^2)=0.73$$

fraction of the IP packets to the Webtransaction workload.

This example is intentionally simplified. It is possible to construct more than one workload from the same log file, as different activities in the file could be tracked separately. Also, two different log files could be used (say one for Web activities and another for database activities).

Formula

In general, if we are allocating a resource among workloads, we will use the following formula, $$R_i = \frac{C_i^2 U_i}{\sum_j C_j^2 U_j} R, \quad (2)$$

where R is the total amount of the resource, $R_i$ is the amount to be allocated to the $i^{th}$ Workload, $C_i$ is the correlation coefficient (CC) between the use profile of the workload and resource, and $U_i$ is the utilization of the workload and we sum over all workloads with a positive correlation.

This empirical formula gives a plausible allocation of resource R among the workloads. In the example above, we created a workload by inference from a log file, so we had to make certain assumptions in using the formula. First, we assumed in all cases that the correlation of the Other was one less the correlation of the Web server workload. Second, since the utilization was computed second hand, we didn't use it to distribute other resources, but made utilization a constant.

In the following section, process information is used to create the model, and these issues will become moot.

Automatic Workload Characterization by Processes

We can improve our model by including process information. However, individual processes may not live throughout the collection process, and therefore they are not good candidates for correlating with resource usage profiles. For this reason, we start by making workloads out of groups of related processes, and the correlation techniques described above are then used to determine how much of each resource belongs in each workload. The advantages of this technique over the method for automatic characterization of workloads by "business curves" include, but are not limited to, the following:

1) We will know precisely how much CPU each workload consumed (since almost all operating systems provide that information at the process level);
2) For some resources there may be a more relevant metric than CPU consumption provided about the process. That will allow for a more accurate distribution of resource consumption. For instance, for disk IO even if there is not direct information about block IO on a per process basis, there may be information about faults, which is more likely to be related to disk IO than CPU consumption;
3) Log files are not required. However, it is non-trivial to find the most appropriate way to group the processes into workloads.

The remainder of this section shows how this can be done automatically. We start by using the following heuristics:

Processes that have the same owner should be in the same workload.

Processes whose owners are members of the same group should be in the same workload.

Processes that are in the same process tree should be in the same workload. That is, processes that have all been spawned from the same process (directly or indirectly) should be in the same workload.

Thus, if we aggregate processes that have the same owner and belong to the same tree of processes, we can make a good guess at a potential workload. If we add some knowledge about the function of particular processes, we can do better. For instance, for UNIX we can start by looking at all process trees that start below a shell (i.e., spawned by a shell). Then, we can make workloads out of all such trees that have the same owner and whose root process has the same name. The workloads generated by this process become candidate workloads. We say candidate workloads because, many times, it will be clear that two or more workloads are related and should be aggregated.

In general, processes must cooperate with other processes in order to accomplish a task. Modem computation architecture, which often involves multiple software components, such as GUI, database, etc., greatly increases the amount of interaction. Thus we will expect to find that many of the candidate workloads actually seem to be supporting the same activity and could be aggregated. To do this, we treat each workload as a resource. Those workloads that correlate well are aggregated. It is also beneficial to allow the user to "unaggregate" aggregated candidate workloads, or aggregate workloads that the algorithm has not aggregated.

The key to aggregating candidate workloads is to identify the correlation among them. The algorithm described in section 2, with some modifications, can help us to establish the correlation based on the correlation coefficient of each candidate workload pair. Using the algorithm, we can list the candidate workloads by the correlation coefficient value (from high to low) or list them by the names of the candidate workloads. Let's see an example.

Example 2

Figure 7:
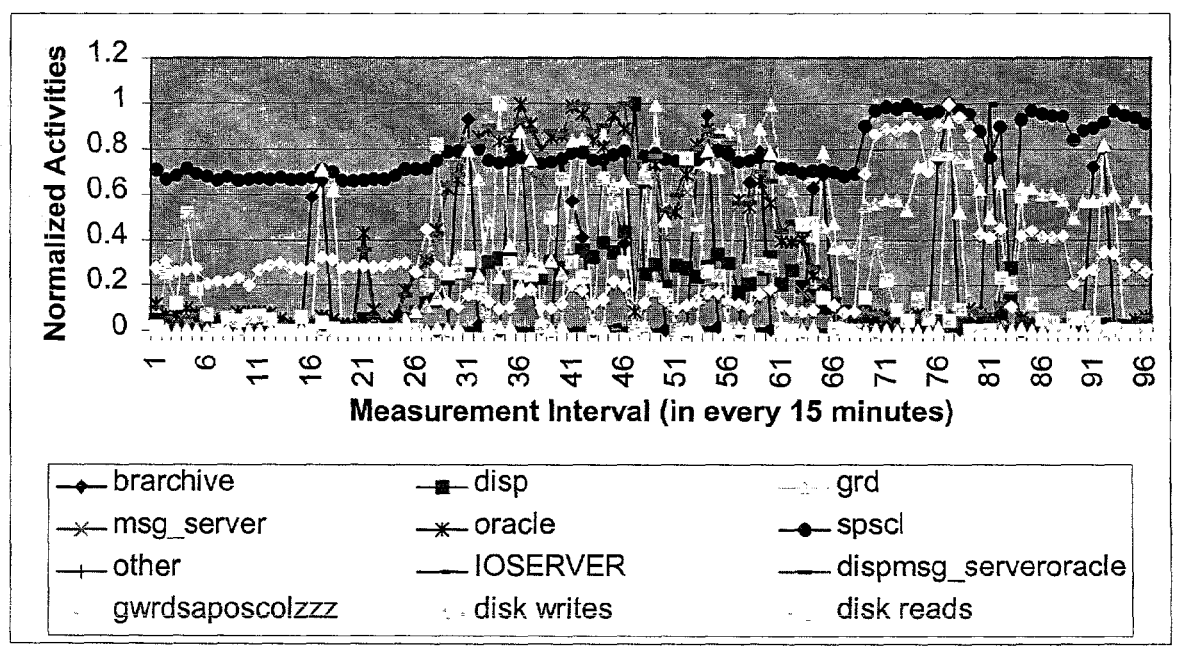
FIG. 7 shows an example of normalized activities for objects (workloads and disk) listed in Table 8 of FIG. 15.

Table 8 (FIG. 15) shows a list of candidate workloads. Table 8 lists activities, measured by utilization for candidate and aggregated workloads, reads or writes per second for disk, for a twenty-processor machine. Each number in the table is an average over a 15-minute interval. Since it is a 20-processor machine, the maximum possible number is 2000. The original table has 96 rows (covering 24 hours); for space reasons, only the first 20 rows are shown in FIG. 15. FIG. 7 illustrates the normalized activities (utilization and I/O rate), after using the linear transformation (1), of the candidate workloads. There are many pairs of workloads in FIG. 7 that are highly correlated, though others are not correlated. Table 9 (FIG. 16) lists pairs of candidate workloads ordered by the correlation coefficient values from high to low.

We will aggregate workloads by the following procedure: First, we set a threshold to indicate a significant relationship (correlation). Here, we will set it at 0.5 (i.e., c=0.5 for the algorithm in section 2.1). Starting at the top, we create one workload out of the workloads that have the highest correlation. So, msg_server, oracle and disp are aggregated. Then, other, grd, spscl are aggregated. Thus, we end up with the following workloads:

{msg_server, oracle, disp},
{other, grd, spscl},
{IOSERVER}, and
{brarchive}.

Note that 0.5 is arbitrary, and if we chose a different lower bound we get a different result—there is never just one way to do workload characterization. There is also an issue of transitivity: that is, spscl is highly correlated with grd and other while grd and other are poorly correlated. The simplest solution is to disregard the problem, as we do here, and put everything in the same workload. Alternatively, the three workloads can be made into two, with the activity of the workload that correlates well with other two distributed between them. In other words, the workload that correlates with both other workloads may be considered a dependent workload, in that any work of the two workloads requires some assistance by the shared workload.

Relating Workloads and Resource Usage

Once the workloads have been determined, the next goal is to find out how much of each resource each workload used. Our procedure is this: For each time interval in which data was collected, sum the CPU used by the processes in each workload. For the resource of interest, collect the resource consumption data for the same time interval. Then, compute the correlation coefficient between the use profile (representing CPU) for each workload, and the use profile of the resource in question. After that the resource can be distributed to the workloads by formula (2). This tends to ensure that most of the resource will be assigned to the workload that most highly correlates with the usage of that resource. But any workload that has a positive correlation with the resource will be assigned some of it.

The use profiles of the aggregated workloads have been put in Table 8 (FIG. 15) after the original candidate workloads. Now we can start to calculate a model for a particular interval as follows (we choose the $17^{th}$ interval):

For each workload we arbitrarily say that a transaction takes 0.1 CPU seconds. (Without a log file, it is hard to figure out what a 'real' transaction is.) Then the number of transactions per hour is found by turning the listed utilization into a decimal (divide by 100), multiplying by 3600 (the number of seconds in an hour) and dividing by 0.1.

To include another resource in the model, we look at the activity of a particular disk. We give its use profile in the last two columns of Table 8 (FIG. 15). From these profiles we compute the correlations shown in Table 10 (FIG. 17).

Now we will distribute reads and writes to the workloads using formula (2). (Here, if fault information was available, we could use that instead of utilization.) Since two of the workloads had negative correlations with the disk, they will not receive any of the IO. (Note: in real life these workloads did perform IO, but not to the disk we chose to include in the model.)

We end up with the following model:
Workload msg_server/oracle/disp
Transactions per Hour 49485.6
CPU per Transaction 0.1
Reads per Transaction 1.89
Writes per Transaction 1.95
Workload other/grd/spscl
Transactions per Hour 56325.6
CPU per Transaction 0.1
Workload IOServer
Transactions per Hour 162
CPU per Transaction 0.1
Workload brarchive
Transactions per Hour 1152
CPU per Transaction 0.1
Reads per Transaction 3.30
Writes per Transaction 0.04

Note that, if two workloads are strongly correlated, it is not possible to determine which of them used a particular resource, unless resource usage can be surmised from internal data. Of course, this is not a concern, if the correlated workloads are aggregated, as suggested.

Refinement of Automatic Workload Characterization Based on Application Information Additional knowledge about particular applications can be used to refine the workloads and performance models that are generated automatically. The workload generation procedure may be incremental. Often the knowledge about the name of the processes that are used to support a particular application, such as Oracle, SAP, etc., could be used to further refine or enhance the information about the processes of interests. For instance, in Oracle, RDBMS processes all contain 'oracle' in their process name. These processes can then be automatically grouped into a candidate workload.

Automatic Workload Characterization for Auto Prediction/What if Analysis

From a performance modeling point of view, grouping statistically related processes together to form workloads increases the accuracy of what-if prediction. As one increases the activity for a particular process, the activity of (positively) correlated processes is more likely to increase as well. Characterizing workloads that include those related processes will make the resource demand computation more consistent with workload changes. Furthermore, grouping the processes that support a business activity together will more accurately pinpoint the potential bottlenecks as business grows. The workloads that include all processes related to a business activity will represent the true amount of resource consumption of each transaction.

Automatic workload characterization will also have many positive implications in performance modeling and capacity planning. Collection of data and workloads generation can be thought of as an ongoing process. Collection over a period of time (weeks or a few months) can chronicle trends among the workloads generated. One can then extrapolate these trends, in terms of growth rate of the workloads, and create a projected model of future activity. The projected model can be evaluated using traditional tools to generate a prediction of the future performance of the system.

In an ideal case, all the analyst need do is to supply the location of the business log files in electronic forms. The data collection, analysis and prediction tools will do the rest. Collection should run as log files record the business activities of interest. A data analysis tool will then use the collected data and log files to find workloads. Once workloads have been created over an extended length of time, comparable periods will be matched, and trends found. The projections on growth can now be made into a model to be evaluated. This will give the user a prediction of future system bottlenecks and resource needs. This technique may be referred to as "predictive alerting."

Various embodiments further include receiving or storing instructions and/or data implemented in accordance with the foregoing description upon a carrier medium. Suitable carrier mediums include storage mediums or memory mediums such as magnetic or optical media, e.g., disk or CD-ROM, as well as signals such as electrical, electromagnetic, or digital signals, conveyed via a communication medium such as networks 102 and 104 and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of characterizing a computer system having resources and processes, the processes consuming the resources when performing transactions, the method comprising:
   independently generating a log of transactions performed in the computer system, wherein the log of transactions comprises a timestamp for each of the transactions;
   independently generating a log of resource usage in the computer system, wherein the log of resource usage comprises one or more periods of time during which each of a plurality of the resources is used, and wherein the log of resource usage comprises a plurality of system performance metrics, the system performance metrics reflecting consumption of the resources by one or more of the processes that performed the transactions;
   comparing the timestamps in the log of transactions to the periods of time in the log of resource usage to determine timestamps corresponding to the periods of time; and
   determining which transactions used which resources based on the comparison of the timestamps in the log of transactions to the periods of time in the log of resource usage.

2. The method of claim 1, wherein said determining which transactions used which resources based on the comparison of the timestamps in the log of transactions to the periods of time in the log of resource usage comprises:
   computing at least one correlation coefficient by computing a covariance of transaction activities and resource usage in the logs; and
   analyzing whether the at least one correlation coefficient is at least greater than a desired correlation valve to determine whether the transactions use the resource.

3. The method of claim 1, wherein said determining which transactions used which resources includes determining the amount of resources used by each of one or more of the transactions.

4. The method of claim 1, further comprising:
   determining one or more workloads based on said determining which transactions used which resources, wherein each workload comprises a partition of the transactions performed on the computer system.

5. The method of claim 4, further comprising:
   modeling performance of the computer system using the workloads by correlating the transactions of the workloads to the resource usage utilized by the transactions of the workloads.

6. The method of claim 5, further comprising:
   altering a configuration of the computer system based on the modeling the performance of the computer system.

7. The method of claim 4, further comprising:
   determining an aggregate workload, wherein the aggregate workload comprises a plurality of the workloads.

8. The method of claim 1, further comprising:
   determining one or more workloads based on said determining which transactions used which resources, wherein each workload comprises a meaningful partition of the processes.

9. The method of claim 8, further comprising:
   determining a quantity of resource usage belonging to each workload.

10. The method of claim 8, further comprising:
    determining that processes having a same owner belong to a same one of the workloads.

11. The method of claim 8, further comprising:
    determining that processes whose owners are members of a same group belong to a same one of the workloads.

12. The method of claim 8, further comprising:
    determining that processes having a same process tree belong to a same one of the workloads.

13. The method of claim 1, wherein said determining which transactions used which resources is performed automatically by the computer system.

14. A method of characterizing workload of a computer system having resources and processes, the processes consuming the resources when performing transactions, the method comprising:
    independently determining a list of transactions performed on the computer system over a time interval;
    independently determining a list of system performance metrics for the computer system over the time interval, wherein the system performance metrics reflect consumption of the resources by one or more of the processes that performed the transactions;
    determining a correlation coefficient for each of one or more pairs of system performance metrics and transactions in the lists;
    determining a supporting set of pairs of system performance metrics and transactions whose correlation coefficients exceed a desired correlation value; and
    determining a workload using the supporting set, wherein the workload comprises a meaningful partition of transactions performed on the computer system.

15. The method of claim 14, wherein said determining the workload comprises determining the workload such that the workload comprises processes which correlate to the system performance metrics in the supporting set.

16. The method of claim 14, wherein said determining the workload comprises determining the workload such that the workload comprises processes whose resource consumption as reflected by the system performance metrics correlates with the partition of transactions in the workload.

17. A programmable storage device comprising program instructions, wherein the program instructions are computer-executable to implement a method of characterizing a computer system having resources and processes, the processes consuming the resources when performing transactions, the method comprising:
independently generating a log of transactions performed in the computer system, wherein the log of transactions comprises a timestamp for each of the transactions;
independently generating a log of resource usage in the computer system, wherein the log of resource usage comprises one or more periods of time during which each of a plurality of the resources is used, and wherein the log of resource usage comprises a plurality of system performance metrics, the system performance metrics reflecting consumption of the resources by one or more processes that performed the transactions;
comparing the timestamps in the log of transactions to the periods of time in the log of resource usage; and
determining which transactions used which resources based on the comparison of the timestamps in the log of transactions to the periods of time in the log of resource usage.

18. The programmable storage device of claim 17, wherein said determining which transactions used which resources based on the comparison of the timestamps in the log of transactions to the periods of time in the log of resource usage comprises:
computing at least one correlation coefficient by computing a covariance of transaction activities and resource usage in the logs; and
analyzing whether the at least one correlation coefficient is at least greater than a desired correlation value to determine whether the transactions use the resource.

19. The programmable storage device of claim 17, wherein said determining which transactions used which resources includes determining the amount of resources used by each of one or more of the transactions.

20. The programmable storage device of claim 19, wherein the program instructions are further computer-executable to implement:
determining one or more workloads based on said determining which transactions used which resources, wherein each workload comprises a partition of the transactions performed on the computer system.

21. The programmable storage device of claim 20, wherein the program instructions are further computer-executable to implement:
modeling performance of the computer system using the workloads by correlating the transactions of the workloads to the resource usage utilized by the transactions of the workloads.

22. The programmable storage device of claim 21, wherein the program instructions are further computer-executable to implement:
altering a configuration of the computer system based on the modeling the performance of the computer system.

23. The programmable storage device of claim 20, wherein the program instructions are further computer-executable to implement:
determining an aggregate workload, wherein the aggregate workload comprises a plurality of the workloads.

24. The programmable storage device of claim 19, wherein the program instructions are further computer-executable to implement:
determining one or more workloads based on said determining which transactions used which resources, wherein each workload comprises a meaningful partition of the processes.

25. The programmable storage device of claim 24, wherein the program instructions are further computer-executable to implement:
determining a quantity of resource usage belonging to each workload.

26. The programmable storage device of claim 24, wherein the program instructions are further computer-executable to implement:
determining that processes having a same owner belong to a same one of the workloads.

27. The programmable storage device of claim 24, wherein the program instructions are further computer-executable to implement:
determining that processes whose owners are members of a same group belong to a same one of the workloads.

28. The programmable storage device of claim 24, wherein the program instructions are further computer-executable to implement:
determining that processes having a same process tree belong to a same one of the workloads.

29. The programmable storage device of claim 19, wherein said determining which transactions used which resources is performed automatically by the computer system.

30. A programmable storage device comprising program instructions, wherein the program instructions are computer-executable, to implement a method of characterizing workload of a computer system having resources and processes, the processes consuming the resources when performing transactions, the method comprising:
independently determining a list of transactions performed on a computer system over a time interval;
independently determining a list of system performance metrics for the computer system over the time interval, wherein the system performance metrics reflect consumption of the resources by one or more of the processes that performed the transactions;
determining a correlation coefficient for each of one or more pairs of system performance metrics and transactions in the lists;
determining a supporting set of pairs of system performance metrics and transactions whose correlation coefficients exceed a desired correlation value; and
determining a workload using the supporting set, wherein the workload comprises a meaningful partition of transactions performed on the computer system.

31. The programmable storage device of claim 30, wherein said determining the workload comprises determining the workload such that the workload comprises processes which correlate to the system performance metrics in the supporting set.

32. The programmable storage device of claim 30, wherein said determining the workload comprises determining the workload such that the workload comprises processes whose resource consumption as reflected by the system performance metrics correlates with the partition of transactions in the workload.

33. A system for characterizing a computer system having resources and processes, the processes consuming the resources when performing transactions, the system comprising:

a CPU;

a memory coupled to the CPU, wherein the memory stores program instructions which are executable by the CPU to:

independently generate a log of transactions performed in the computer system, wherein the log of transactions comprises a timestamp for each of the transaction;

independently generate a log of resource usage of the resources in the computer system, wherein the log of resource usage comprises one or more periods of time during which each of a plurality of the resources is used, and wherein the log of resource usage comprises a plurality of system performance metrics, the system performance metrics reflecting consumption of the resources by one or more of the processes that performed the transactions;

compare the timestamps in the log of transactions to the periods of time in the log of resource usage; and determine which transactions used which resources based on the comparison of the timestamps in the log of transactions to the periods of time in the log of resource usage.

34. The system of claim 33, wherein said determining which transactions used which resources based on the comparison of the timestamps in the log of transactions to the periods of time in the log of resource usage comprises:

computing at least one correlation coefficient by computing a covariance of transaction activities and resource usage in the logs; and analyzing whether the at least one correlation coefficient is at least greater than a desired correlation value to determine whether the transactions use the resource.

35. The system of claim 33, wherein said determining which transactions used which resources includes determining the amount of resources used by each of one or more of the transactions.

36. The system of claim 33, wherein the program instructions are further executable by the CPU to:

determine one or more workloads based on said determining which transactions used which resources, wherein each workload comprises a partition of the transactions performed on the computer system.

37. The system of claim 36, wherein the program instructions are further executable by the CPU to:

model performance of the computer system using the workloads by correlating the transactions of the workloads to the resource usage utilized by the transactions of the workloads.

38. The system of claim 37, wherein the program instructions are further executable by the CPU to:

alter a configuration of the computer system based on modeling the performance of the computer system.

39. The system of claim 36, wherein the program instructions are further executable by the CPU to:

determine an aggregate workload, wherein the aggregate workload comprises a plurality of the workloads.

40. The system of claim 33, wherein the program instructions are further executable by the CPU to:

determine one or more workloads based on determining which transactions used which resources, wherein each workload comprises a meaningful partition of the processes.

41. The system of claim 40, wherein the program instructions are further executable by the CPU to:

determine a quantity of resource usage belonging to each workload.

42. The system of claim 40, wherein the program instructions are further executable by the CPU to:

determine that processes having a same owner belong to a same one of the workloads.

43. The system of claim 40, wherein the program instructions are further executable by the CPU to:

determine that processes whose owners are members of a same group belong to a same one of the workloads.

44. The system of claim 40, wherein the program instructions are further executable by the CPU to:

determine that processes having a same process tree belong to a same one of the workloads.

45. The system of claim 33, wherein said determining which transactions used which resources is performed automatically by the computer system.

46. A system for characterizing a computer system having resources and processes, the processes consuming the resources when performing transactions, the system comprising:

a CPU;

a memory coupled to the CPU, wherein the memory stores program instructions which are executable by the CPU to:

independently determine a list of transactions performed on a computer system over a time interval;

independently determine a list of system performance metrics for the computer system over the time interval, wherein the system performance metrics reflect consumption of the resources by one or more of the processes that performed the transactions;

determine a correlation coefficient for each of one or more pairs of system performance metrics and transactions;

determine a supporting set of pairs of system performance metrics and transactions whose correlation coefficients exceed a desired correlation value; and determine a workload using the supporting set, wherein the workload comprises a meaningful partition of transactions performed on the computer system.

47. The system of claim 46, wherein in determining the workload, the program instructions are executable by the CPU to determine the workload such that the workload comprises processes which correlate to the system performance metrics in the supporting set.

48. The system of claim 46, wherein in determining the workload, the program instructions are executable by the CPU to determine the workload such that the workload comprises processes whose resource consumption as reflected by the system performance metrics correlates with the partition of transactions in the workload.

* * * * *